United States Patent [19]

Klein

[11] 4,236,642

[45] Dec. 2, 1980

[54] CONNECTOR ASSEMBLY FOR A STORAGE RACK

[75] Inventor: Herbert H. Klein, Arlington Heights, Ill.

[73] Assignee: Unarco Industries, Inc., Chicago, Ill.

[21] Appl. No.: 882,734

[22] Filed: Mar. 2, 1978

[51] Int. Cl.³ .............................................. A47F 5/00
[52] U.S. Cl. ................................... 211/207; 211/182; 403/233; 403/175
[58] Field of Search ............... 211/182, 183, 207, 191, 211/189; 403/223, 199, 234, 235, 233, 237, 174, 175, 178

[56] References Cited

U.S. PATENT DOCUMENTS 2,765,087 10/1956 Weinbaum ..................... 211/182 X
4,053,246 10/1977 Uccello ........................... 211/182 X Primary Examiner—Roy D. Frazier
Assistant Examiner—Robert W. Gibson, Jr.
Attorney, Agent, or Firm—Clement and Ryan

[57] ABSTRACT

A connector assembly for connecting adjacent horizontal beams of a storage rack to an imperforate post substantially without permanently deforming and damaging the imperforate post. The connector assembly includes a pair of connectors that have support plates which are welded or otherwise secured to the beams and interlockingly engageable fingers that substantially prevent the connector assembly from being pulled apart when the beams are under load. A supplementary fastener connects the support plates and firmly clamps the connector assembly to the post.

20 Claims, 3 Drawing Figures

U.S. Patent  Dec. 2, 1980  Sheet 1 of 2  4,236,642
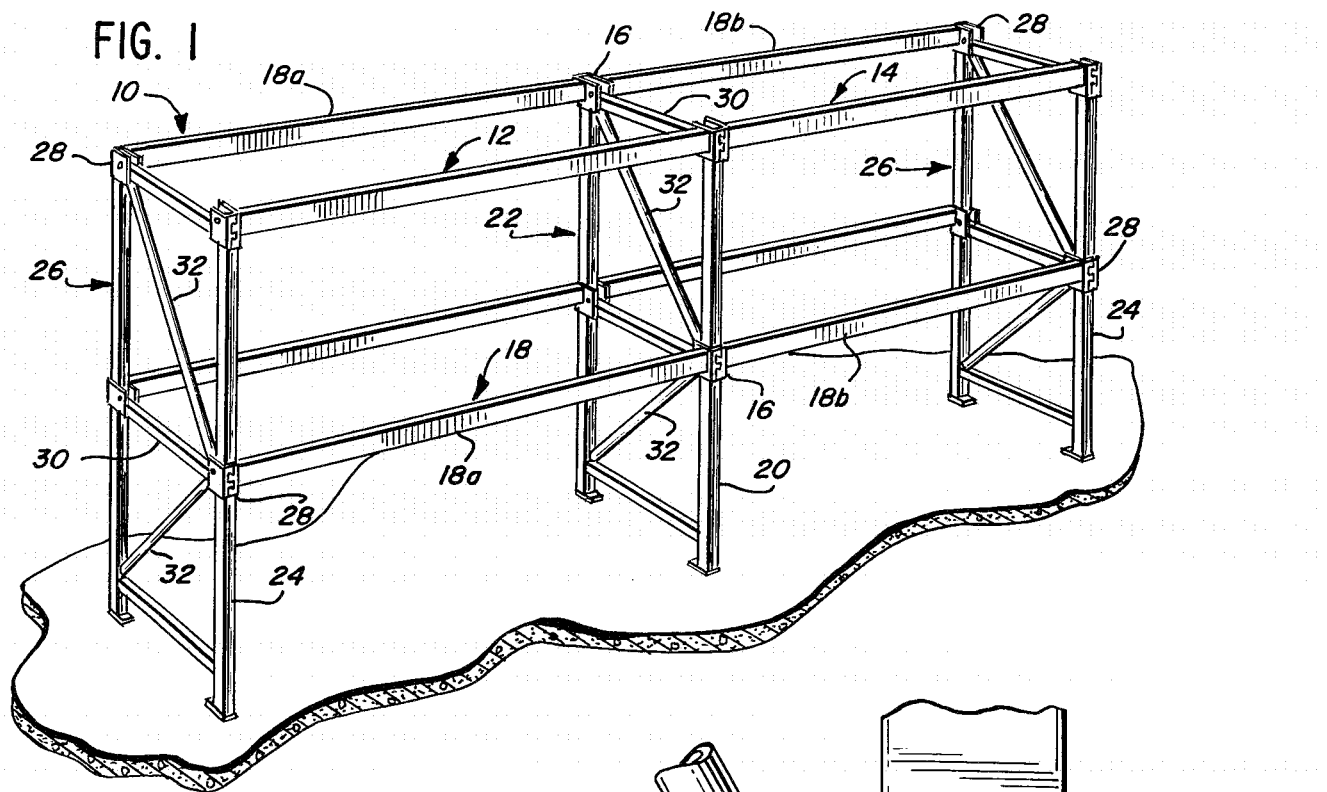
FIG. 1
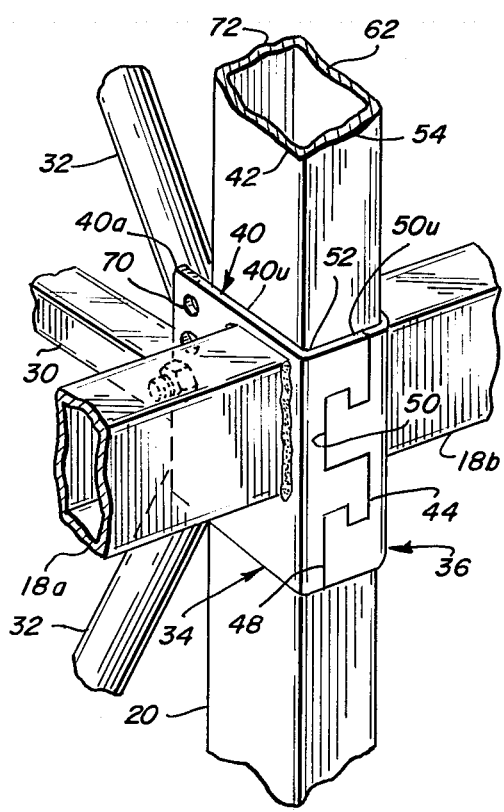
FIG. 2
FIG. 3

CONNECTOR ASSEMBLY FOR A STORAGE RACK

BACKGROUND OF THE INVENTION

This invention relates to storage racks, and more particularly, to a connector assembly for connecting adjacent horizontal beams or support bars to upright posts of a storage rack.

Over the years a variety of connectors have been developed for connecting adjacent horizontal beams to posts of a storage rack. One type of connector, which is particularly advantageous with perforated posts, that is, posts having a multitude of apertures or slots, is the hook type connector shown in U.S. Pat. Nos. 2,760,650; 3,490,604 and 3,871,525, which is sold by Unarco Industries, Inc. under the trademark Safety Wedge Lock. This connector is typically inserted into the apertures or slots of the post. While the hook type connector is quite useful with perforated posts, it is not generally very effective for use with imperforate posts.

One type of connecting device which has been used with an imperforate post is shown in U.S. Pat. No. 2,876,087.

It therefore desirable to provide an improved connector for rigidly connecting adjacent horizontal beams to an imperforate post.

SUMMARY OF THE INVENTION

An improved connector assembly is provided for rigidly connecting a pair of generally horizontal beams of adjacent storage rack sections to an upright imperforate post without permanently deforming and damaging the post.

The connector assembly has a pair of generally planar support plates that are fixed to and extend entirely across the ends of the beams adjacent the post. Preferably, the support plates extend in a lateral direction, generally perpendicular to the length of the beams.

Each of the support plates are connected to load-supporting fingers that extend longitudinally in a direction towards an opposite beam. The fingers associated with the support plates interlockingly engage each other to substantially prevent the connector assembly from being pulled apart when the beams are under load. Desirably, the fingers have generally planar back surfaces that are positioned to lie in general coplanar relationship to each other and flush against the common outer face of the imperforate post.

Advantageously, the connector assembly also includes a removable fastener that extends between and connects the support plates to compressively fasten the support plates to the imperforate post.

In the illustrative embodiment, each of the support plates define at least one bolt-receiving aperture and the removable fastener is supported by and engages a crossbar that is secured to the imperforate post. Preferably, each of the support plates define a plurality of bolt-receiving apertures for accommodating adjustment of the connector assembly.

In the preferred form, the fingers are L-shaped and have an elongated upright end section adjacent the support plate from which it longitudinally extends. A pair of substantially identical, generally parallel intermediate sections extend generally longitudinally from the elongated upright end section. Upright fingertips extend generally vertically from the intermediate sections at a location generally opposite the elongated upright section. Desirably, the parallel intermediate sections each have a pair of substantially parallel horizontal edges and each fingertip is shorter than the elongated upright end section.

In the preferred embodiment, the top of the support plates are positioned closely adjacent the top of the beams.

A more detailed explanation of the invention is provided in the following description and appended claims taken in conjunction with the accompanying drawings.

BRIEF DESCRIPTION OF THE DRAWINGS

FIG. 1 is a perspective view of connector assemblies in a storage rack in accordance with principles of the present invention;

FIG. 2 is an enlarged perspective view of an intermediate connector assembly connecting adjacent horizontal beams to an intermediate post;

FIG. 3 is an end view of the intermediate connector assembly;

DETAILED DESCRIPTION OF THE ILLUSTRATIVE EMBODIMENT

Figure 4:
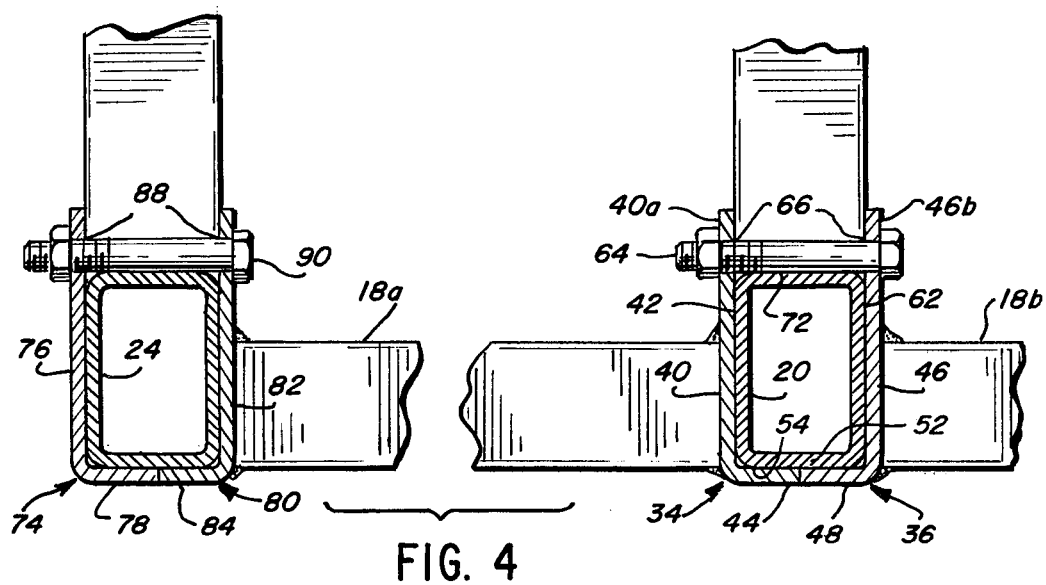
FIG. 4 is a cross-sectional top plan view of the intermediate connector assembly and an end connector assembly.

FIG. 1 of the drawings illustrates a storage rack 10 having a pair of adjacent storage rack sections or modules 12 and 14, respectively, connected in an end-to-end array by intermediate connector assemblies 16. The storage rack 10 is particularly useful for supporting load-carrying pallets, but can also be used for carrying other articles and loads. Additional storage rack sections or modules can be attached by the use of other intermediate connector assemblies 16.

Preferably, the storage rack 10 is constructed of a plurality of elongated, generally horizontal load-carrying beams or support bars 18 that are connected, via the intermediate connector assemblies 16, to upright intermediate posts or columns 20 of intermediate upright frames 22. The ends of the beams 18 are connected, via end connector assemblies 28, to upright end posts or end columns 24 of upright end frames 26. Desirably, the end connector assemblies 28 are structurally similar to the intermediate connector assemblies 16.

In the illustrative embodiment, each upright frame 22 and 26, has a plurality of horizontal cross bars 30, extending transversely between and interconnecting posts 20 or 24. Each upright frame 22 and 26 also has one or more diagonal braces 32 connecting the crossbars 30 to provide additional lateral support for the storage rack 10. In some circumstances it may also be desirable to mount supplementary horizontal crossbars, or a metal deck or fork entry bars upon the beams 18 to provide further support for the load.

Preferably, the beams 18 and posts 20 and 24 are made of metal, such as steel. Other types of metal can also be used.

In the preferred embodiment, the beams 18 and posts 20 and 24 are tubular and have a rectangular cross-sectional configuration or shape as best shown in FIG. 2. Desirably, the beams 18 extend in a longitudinal direction and are positioned generally perpendicular to the laterally extending end faces 42 and 62 of the posts 20.

While tubular posts and beams having a rectangular cross-sectional configuration are preferred, in some circumstances it may be desirable to use solid posts and beams, composite posts and beams, or posts and beams having other cross-sectional configurations and shapes, such as open-sided channel posts and beams or cylindrical posts and beams.

Desirably, posts 20 and 24 and beams 18 are imperforate for ease of cleanliness. In some circumstances, however, it may be desirable that slotted or perforated posts or beams be used with the connector assemblies 16 and 18 of this invention.

Referring now to FIG. 2 of the drawings, each intermediate connector assembly 16 has a pair of generally complementary metal connectors 34 and 36 for horizontally aligning and connecting a pair of adjacent beams 18a and 18b to intermediate post 20.

The first connector has a first support plate or flange 40 that extends entirely across and is welded, or otherwise fixedly secured, in the lateral direction, generally perpendicular to the length of beam 18a, to the end of first beam 18a adjacent the intermediate post 20. Preferably, support plate 40 is generally planar and has a rectangular configuration or shape. When installed, support plate 40 abuts against and intimately engages the lateral end face 42 of the intermediate post 20. Desirably, the top of support plate 40 extends from a position slightly above, but closely adjacent, the beam 18a to a position substantially below the beam 18a, so that the height of the support plate 40 is substantially greater than the height (vertical dimension) of beam 18a.

The first connector 34 also has a first set of gripping fingers 44 extending integrally and angularly from the support plate 40. In the preferred embodiment, the first connector 34 is L-shaped as viewed in top plan view, with the first set of fingers 44 curled generally clockwise and positioned generally perpendicular to support plate 40 so as to extend longitudinally in a direction generally towards the second beam 18b. Desirably, fingers 44 are of the same height as the support plate 40.

Figure 5:
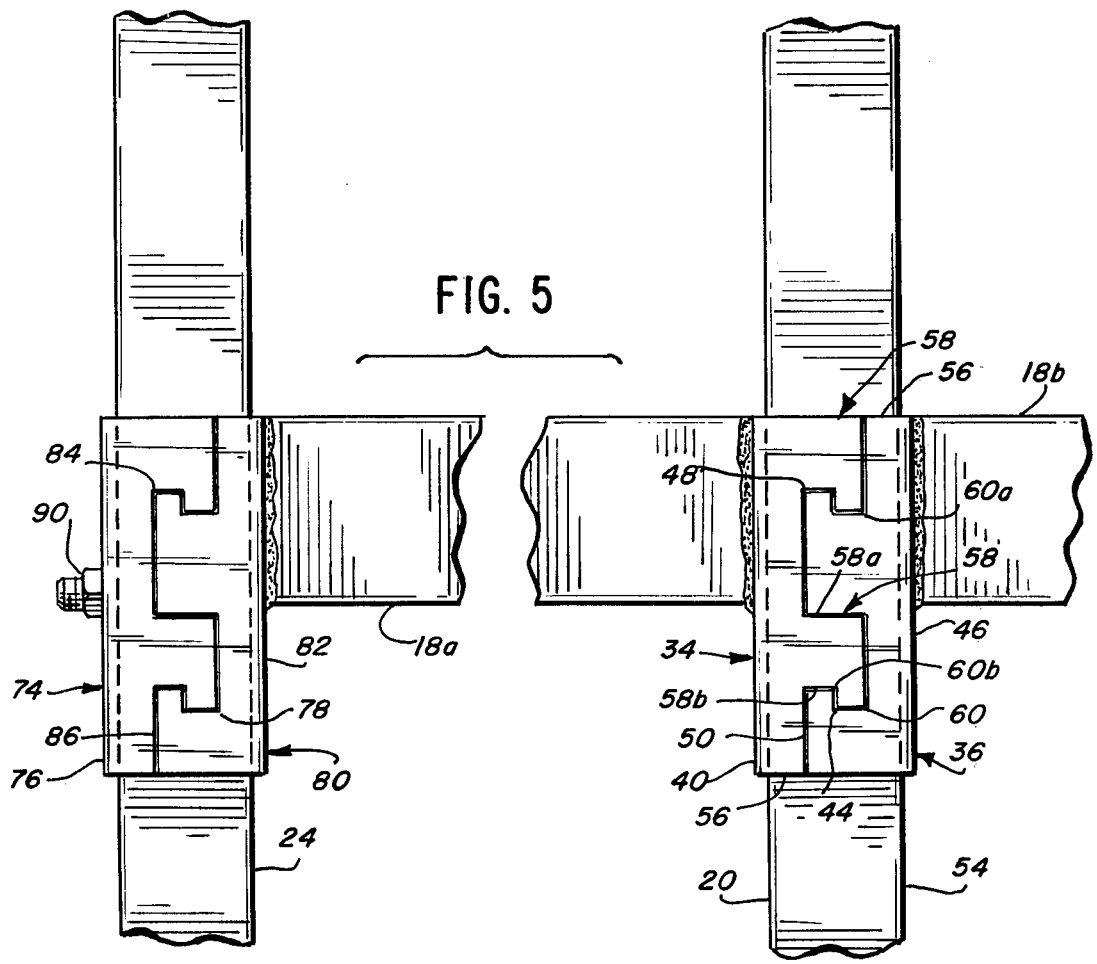
FIG. 5 is a front view of the intermediate connector assembly and the end connector assembly.

As shown in FIGS. 2, 4 and 5, the second connector 36 is generally complementary to the first connector 34. Second connector 36 has a second support plate or flange 46 (FIG. 4) and a second set of gripping fingers 48 which are structurally similar to the first support plate 40 and first set of gripping fingers 44, respectively, of the first connector 34. Second support plate 46 extends entirely across and is welded, or otherwise fixedly secured in a lateral direction, generally perpendicular to the length of said beam 18b, to the end of the second support beam 18b adjacent intermediate post 20. When installed, support plate 46 abuts against and intimately engages the other lateral end face 62 of the intermediate post 20.

The second set of fingers 48 is curled generally clockwise, and is complementary to the first set of fingers 44. Preferably, the second set of fingers 48 extend angularly, and preferably perpendicularly, from the second support plate 46 so as to extend longitudinally in a direction generally towards the first beam 18a.

In use, the first and second set of fingers 44 and 48, respectively, serve as a coupler and cooperate with and releasably grasp each other to interlockingly engage and removably connect the connector assembly 16 to substantially prevent the first and second connectors 34 and 36 from being separated and pulled apart when the beams 18a and 18b are under load.

In the preferred form, each of the sets of fingers 44 and 48 include a pair of generally L-shaped or hook-shaped load-supporting grasping fingers 50 as best shown in FIGS. 2 and 5. Preferably, fingers 50 have a generally planar longitudinal back surface 52 which abuttingly engages and lies substantially flush against a common outer face 54 of intermediate post 20. In the preferred embodiment, outer face 54 extends longitudinally in a direction generally parallel the length of the beams 18.

In the illustrative embodiment, the first and second set of fingers 44 and 48 are positioned in general coplanar relationship with each other so as to form a generally imperforate and continuous grasping surface and finger assemblage across the outer face 54 of the post 20.

As best shown in FIG. 5, fingers 50 each have an elongated upright end section 56 that is positioned adjacent the support plate 40 or 46 from which it extends. A pair of substantially identical, parallel intermediate finger sections 58, one above the other, extend generally horizontally and longitudinally from the elongated upright end section 56. Each of the intermediate sections has a pair of parallel horizontal edges 58a and 58b (FIG. 5). Upright fingertips or forefingers 60 extend from the distal end of intermediate finger sections 58 generally opposite from the elongated upright section 56. In the illustrative embodiments, fingertips 60a of the first connector 34 extend downwardly, while fingertips 60b of the second connector extend upwardly. Desirably, fingertips 60a and 60b have a length substantially shorter than the length of the elongated upright end section 56. In the preferred embodiment, intermediate finger sections 58 are of the same length, as are fingertips 60a and 60b, and each set of fingertips 60a and 60b are in vertical alignment. Preferably, the upper edges 40u (FIG. 2) of the support plate 40 and 46, and the upper edges 50u of the fingers 50 are in horizontal alignment and are in close proximity to and closely adjacent the top of the beams 18a and 18b.

In order to firmly, but releasably, clamp the connectors 34 and 36 compressively against the end faces 42 and 62 (FIG. 4) of the post 20, a fastener 64, such as a bolt, is inserted in bolt-receiving apertures 66 of support plates 40 and 46 to securely connect the support plates 40 and 46. Preferably, support plates 40 and 46 each define a plurality of bolt-receiving apertures 66, 68 and 70 (FIG. 3) which are positioned in general vertical alignment to accommodate vertical adjustment and positioning of each support plate. Desirably, the bolt-receiving apertures of the first support plate 40 are aligned in registration with the bolt-receiving apertures of the second support plate 46.

In the preferred embodiment each of the support plates 40 and 46 has a generally planar outer flange portion 40a and 46b, respectively, that extends laterally outwardly of the post 20 in a direction towards a laterally opposite post (within the interior space of the storage rack) and the bolt-receiving apertures 66, 68 and 70 are spaced away from the inner face 72 (FIG. 4) of the post 20 with enough clearance so that the bolt 64 is comfortably spaced from the post 20 to freely slide into and out of the bolt-receiving apertures 66, 68 and 70 without striking the post 20. Most preferably, the bolt-receiving apertures 66, 68 and 70 should also be spaced far enough away from the beams 18a and 18b so that a socket wrench can freely grasp the nut of the bolt 64 without jamming against the beams 18a and 18b. In the illustrative embodiment bolt 64 rests upon and is supported by the horizontal crossbar 30 of the storage rack 10.

Referring now to the end connector assemblies 28 in FIGS. 1, 4 and 5 which connect the beams 18 to the end posts 24, each end connector assembly 28 has an end connector 74 structurally similar to the first connector 34, but having a laterally extending end support plate or flange 76 adapted to be positioned against the end post 24. The end connector 74 also has an end set of end gripping fingers 78 which extend longitudinally in a direction towards the first beam 18a. End fingers 78 are constructed and arranged substantially similar to the first set of fingers 44 of the first connector 34. End support plate 76 is of the same size and shape as the first support plate 40.

The end connector assembly 28 also includes a third connector 80 (associated with beam 18a) which is complementary to end connector 74 and is structurally similar to second connector 36. Third connector 80 has a third laterally extending support plate or flange 82 welded, or otherwise secured, to the distal end of beam 18a adjacent end post 24 and generally opposite the first connector 34. Third support plate is constructed and arranged similar to the second support plate 46.

Third connector 80 also has a third set of fingers 84 that extend integrally and angularly, and preferably perpendicularly in the longitudinal direction from the third support plate 82 in a direction generally away from the storage rack 10. The third set of fingers 84 are constructed and arranged similar to the second set of fingers 48.

A second removable fastener 90, such as a bolt, extends between and connects the end support plate 76 and the third support plate 82, via bolt-receiving apertures 88, which desirably are positioned and arranged similar to bolt-receiving apertures 66, 68 and 70, to removably clamp and fasten the end support plate 76 and the third support plate 82 compressively against the end faces of the end post 24.

While the preferred type of fasteners 64 and 90 are bolts, it may be desirable in some circumstances to use other types of fasteners such as chains, etc.

To install the beams 18a and 18b, the fingers of adjacent connectors are interlockingly coupled to each other and the fasteners are subsequently inserted into their associated support plates and tightened to clamp the connector assemblies to the posts.

The preceding detailed description has been given for ease of understanding only. No unnecessary limitations are to be understood therefrom, as modifications will be obvious to those skilled in the art.

What is claimed is:

1. A connector assembly for connecting a pair of generally elongated horizontal beams of adjacent storage rack sections to an upright imperforate post, comprising:
    a first generally planar support plate extending entirely across and fixedly secured to an end of one of said beams, said first support plate being positioned generally perpendicular to the length of said beam;
    a second generally planar support plate extending entirely across and fixedly secured to an end of the other of said beams, said second support plate being positioned generally perpendicular to the length of said other beam;
    a first set of gripping fingers extending longitudinally from said first support plate in a direction generally towards the second beam;
    a second set of gripping fingers extending longitudinally from the second support plate in a direction generally towards the first beam for interlockingly engaging and gripping said first set of fingers to substantially prevent said connector assembly from being pulled apart when said beams are under load;
    said first and second set of fingers each having a generally planar back surface lying in generally coplanar relationship to each other for abuttingly engaging and substantially lying flush against a common outer face of said imperforate post; and
    removable fastening means extending between and connecting said first and second support plates for compressively fastening said first and second support plates to said imperforate post.

2. A connector assembly in accordance with claim 1 wherein:
    each of said support plates defines at least one bolt-receiving aperture, and
    said removable fastening means includes a bolt.

3. A connector assembly in accordance with claim 2 wherein each of said support plates defines a plurality of bolt-receiving apertures for accommodating adjustment of the support plates.

4. A connector assembly in accordance with claim 1 wherein each of said sets of fingers include a plurality of substantially identical L-shaped fingers.

5. A connector assembly in accordance with claim 4 wherein each of said sets of fingers include:
    an elongated upright end section adjacent the support plate from which it longitudinally extends;
    a pair of substantially identical, generally parallel intermediate sections extending generally longitudinally from said elongated upright end section; and
    upright fingertips extending from said intermediate sections generally opposite from said elongated upright section and having a length substantially shorter than said elongated upright end section.

6. A connector assembly in accordance with claim 5 wherein:
    said parallel intermediate sections each have a pair of substantially parallel horizontal edges extending longitudinally; and
    said fingertips are disposed in general vertical alignment with each other.

7. A connector assembly in accordance with claim 1 wherein each of said support plates has an upper edge positioned closely adjacent said beams.

8. A connector assembly for connecting a pair of adjacent generally horizontal beams to an upright imperforate post of a storage rack, comprising:
    a first connector having a first support plate secured to one of said adjacent beams, and a first set of gripping fingers extending angularly from said first support plate;
    a second connector having a second support plate secured to the other of said adjacent beams, and a second set of gripping fingers extending angularly from said second support plate for interlockingly engaging and gripping said first set of fingers;
    each of said sets of gripping fingers having a generally planar longitudinal back surface for abuttingly engaging and directly lying substantially flush against said upright imperforate post,
    said first and second set of fingers being positioned in general coplanar relationship with each other for providing a generally imperforate and continuous grasping surface and finger assemblage across portions of said upright imperforate post;

said first and second set of fingers cooperating with and engaging each other along a common plane to substantially prevent said first and second connectors from being separated and pulled apart when said beams are under load;

said first and second support plates each abuttingly engaging and extending laterally outward of said imperforate post;

said support plates positioned in general parallel relationship to each other; and removable fastening means engaging, extending between and operatively connected to said parallel first and second support plates for removably clamping said first and second support plates against said imperforate post.

9. A connector assembly in accordance with claim 8 wherein:

each of said parallel support plates has a plurality of bolt-receiving apertures positioned in general vertical alignment with each other for accommodating vertical adjustment of the parallel support plates;

said removable fastening means includes a bolt positioned in one of said bolt-receiving apertures and cooperating with a nut for compressively clamping said parallel support plates and said coplanar sets of gripping fingers against said upright imperforate post; and said bolt and nut being spaced away from said beams for permitting said nut to be freely grasped with a wrench.

10. A connector assembly in accordance with claim 8 wherein:

the top of each connector is positioned in close proximity to the top of the beam with which it is associated, and each connector extends far below the level of the beam with which it is associated and is of a height greater than the height defining the maximum vertical dimension of said beam.

11. A storage rack, comprising:

a first elongated generally horizontal beam extending in a longitudinal direction;

a second elongated generally horizontal beam extending in said longitudinal direction;

an intermediate upright post having an outer face positioned generally parallel to said first and second beam in said longitudinal direction, and a pair of end faces positioned in a lateral direction generally perpendicular to said first and second beams;

an intermediate connector assembly for connecting said first and second beams in general horizontal alignment to said intermediate post;

said intermediate connector assembly including a first connector having a first generally planar support plate extending entirely across and fixedly secured to said first beam adjacent said intermediate post for positioning against one of said end faces in the lateral direction generally perpendicular to the length of said first beam, said first connector having a first set of fingers extending integrally and longitudinally from said first support plate in a direction generally towards the second beam;

a second connector having a second generally planar support plate extending entirely across and fixedly secured to said second beam adjacent said intermediate post for positioning against the other of said end faces in the lateral direction generally perpendicular to the length of said second beam, said second connector having a second set of fingers extending integrally and longitudinally from said second support plate in a direction generally towards the first beam for interlockingly engaging said first set of fingers to substantially prevent said first and second connectors from being separated and pulled apart when said first and second beams are under load, said first and second connectors being complementary to each other and having generally planar back surfaces lying in generally coplanar relationship to each other for abutting against said outer face, and removable fastening means extending between and operatively connecting said first and second support plates for removably clamping said first and second support plates against said intermediate post.

12. A storage rack in accordance with claim 11 wherein:

said intermediate post is substantially imperforate;

said first and second support plates each have an outer flange portion extending laterally outward of said intermediate post; and said removable fastening means is spaced from said post and removably connects said outer flange portions to firmly, but releasably, clamp said first and second support plates compressively against said intermediate post without substantially deforming and damaging said intermediate post.

13. A storage rack in accordance with claim 12 wherein:

said first and second support plates each define at least one bolt-receiving aperture, and said removable fastening means includes a bolt, said storage rack further including a generally horizontal crossbar secured to said intermediate post, and said bolt intimately engages and is supported by said crossbar.

14. A storage rack in accordance with claim 13 wherein each of said support plates define a plurality of vertically aligned bolt-receiving apertures for accommodating vertical adjustment of the connector to which it is associated.

15. A storage rack in accordance with claim 11 wherein:

said intermediate post has a rectangular cross-sectional configuration;

said first and second support plates are disposed in general parallel relationship to each other, and said first and second connectors are each generally L-shaped as viewed in top plan view.

16. A storage rack in accordance with claim 11 wherein:

said first connector extends below said first beam, said second connector extends below said second beam, and said first and second connectors are generally of the same height.

17. A storage rack in accordance with claim 11 wherein each of said sets of fingers include:

an elongated upright end section adjacent the support plate from which it extends, a pair of substantially identical, generally parallel intermediate sections extending generally longitudinally from said elongated upright end section, said parallel intermediate sections being generally of the same length, each intermediate section having a pair of substantially parallel horizontal edges, one of said intermediate sections being disposed above the other intermediate section and having one of said horizontal edges defining an upper edge closely adjacent the beam to which it is associated, and upright fingertips extending from said intermediate sections generally opposite from said elongated upright section and having a length substantially shorter than said elongated upright end section, and said fingertips being disposed in general vertical alignment with each other.

18. A storage rack in accordance with claim 11 wherein:

said intermediate post is generally tubular, and said connectors are each welded to their respective beams.

19. A storage rack, comprising:

a first generally horizontal beam;

a second generally horizontal beam;

an intermediate upright post;

a first crossbar secured to said intermediate post;

an intermediate connector assembly for connecting said first and second beams in general horizontal alignment to said intermediate post;

said intermediate connector assembly including a first connector having a first support plate secured to said first beam adjacent said intermediate post, and a first set of fingers extending integrally and angularly from said first support plate, a second connector having a second support plate secured to said second beam adjacent said intermediate post, and a second set of fingers extending integrally and angularly from said second support plate, said first and second set of fingers cooperating with each other for substantially preventing said first and second connectors from being separated and pulled apart when said first and second beams are under load, said first and second connectors being complementary to each other, and first removable fastening means extending between and operatively connected to said first and second support plates for removably clamping said first and second support plates against said intermediate posts, said first removable fastening means engaging and being supported by said first crossbar;

an upright end post;

a second crossbar secured to said end post;

said first beam extending between said intermediate post and said end post;

an end connector assembly for connecting said first beam to said end post;

said end connector assembly including an end connector substantially structurally similar to said first connector but having an end support plate for positioning against said end post and a set of end fingers extending integrally and angularly from said end plate, a third connector substantially similar to said second connector but having a third support plate secured to said first beam adjacent said end posts and generally opposite said first connector, and a third set of fingers extending integrally and angularly from said third support plate, said set of end fingers and said third set of fingers cooperating with each other for substantially preventing said end connector and said third connector from being separated and pulled apart when said first beam is under load, said end connector and said third connector being complementary to each other, and second removable fastening means extending between and operatively connected to said end support plate and said third support plate for removably clamping said end support plate and said third support plate against said end post and said second removable fastener means engaging and being supported by said second crossbar.

20. A storage rack in accordance with claim 19, wherein:

said end post is substantially imperforate and has a rectangular cross-sectional configuration, said end support plate is generally perpendicular to said set of end fingers, said third support plate is generally perpendicular to said third set of fingers, said set of end fingers and said third set of fingers each include a plurality of generally L-shaped fingers, said set of end fingers and said third set of fingers are positioned in generally coplanar relationship with each other for releasable interlocking engagement with each other, said end support plate and said third support plate each extend laterally outward of said end post and define at least one bolt-receiving aperture, and said removable fastening means include a bolt.

* * * * *